United States Patent
Calcote (10) Patent No.: US 6,999,305 B1
(45) Date of Patent: Feb. 14, 2006

(54) MODULAR ELECTRICAL DISTRIBUTION SYSTEM

(75) Inventor: Grady L. Calcote, Lawrenceville, GA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 335 days.

(21) Appl. No.: 10/228,902

(22) Filed: Aug. 27, 2002

(51) Int. Cl.
*H02B 1/00* (2006.01)

(52) U.S. Cl. ............ 361/601; 174/50; 317/223.1; 361/641; 361/644; 361/603; 361/735; 361/679

(58) Field of Classification Search ........... 52/220.7, 52/239; 174/48, 50, 59; 312/197–198, 223.1, 312/263–264, 265.1–265.4, 348.2, 223.6; 361/600–673, 679, 728–735, 744
See application file for complete search history.

(56) References Cited

U.S. PATENT DOCUMENTS

| | | | | |
|---|---|---|---|---|
| 4,426,674 A | * | 1/1984 | Holte | 361/625 |
| 5,675,194 A | * | 10/1997 | Domigan | 307/147 |
| 6,603,660 B1 | * | 8/2003 | Ehn et al. | 361/694 |
| 6,657,123 B1 | * | 12/2003 | Moore | 174/50 |
| 2003/0011289 A1 | | 1/2003 | Adams et al. | |

* cited by examiner

*Primary Examiner*—Gregory Thompson
(74) *Attorney, Agent, or Firm*—Foley & Lardner LLP (57) ABSTRACT

A modular electrical distribution system includes a number of linked segments. A first electrical component is mounted in one of the segments and a second electrical component is mounted in another one of the segments. The first and second electrical components are made by different manufacturers. The linked segments are configured to be transported as a single unit without an additional external framework.

25 Claims, 6 Drawing Sheets

MODULAR ELECTRICAL DISTRIBUTION SYSTEM

FIELD OF THE INVENTION

The present invention relates to an electrical distribution system. In particular, the present invention relates to a modular power distribution unit configured to house multiple types of electrical equipment.

BACKGROUND OF THE INVENTION

Facilities, such as commercial buildings or office complexes, typically have one or more centralized electrical distribution centers that include the electrical components required to operate the facility. Such electrical components may include a main distribution panel, panelboards, lighting control centers, transformers, telephone systems, computer systems, and so forth.

When a facility is being constructed or remodeled, a new electrical distribution center may be desired. One way of constructing an electrical distribution center is to order the various electrical components from the associated manufacturers or distributors and individually mount the components onto a framework built and wired at the facility itself. Constructing an electrical distribution center in this fashion requires the use of engineering personnel to design the custom-built installation and professional electricians to install and wire the components. Further, a custom-built onsite installation may inefficiently utilize space as the components provided by the various manufacturers may not permit vertical stacking, and may not be efficiently integrated with one another.

It would be advantageous to have an electrical distribution center having a modular design that may be constructed at an offsite facility and may include various electrical components from different manufacturers. It would also be advantageous if such a modular electrical distribution center were transportable to the construction site and easily installed once delivered. It would further be advantageous if the modular electrical distribution center were scalable such that varying needs of customers could be met by linking together a number of modular segments to create a single transportable electrical distribution center.

It would be desirable to provide a system and/or method that provides one or more of these or other advantageous features.

SUMMARY OF THE INVENTIONS

The present invention relates to a method of making a modular electrical distribution system. The method includes the steps of providing first and second interchangeable segments, installing a first electrical component in the first interchangeable segment, installing a second electrical component of a different type than the first electrical component in the second interchangeable segment, and attaching the segments to one another to form a single unit.

The present invention also relates to a modular electrical distribution system having a number of linked segments. A first electrical component is mounted in one of the segments and a second electrical component is mounted in another one of the segments and the first and second electrical components are made by different manufacturers. The linked segments are configured to be transported as a single unit without an additional external framework.

The present invention also relates to a modular electrical distribution segment having a housing with an interior space and a door providing access to the interior space. A means for mounting is inside the housing and is configured to support a piece of electrical equipment. The means for mounting accepts pieces of electrical equipment having different dimensions.

The present invention is capable of other embodiments and of being practiced or being carried out in various ways. Alternative exemplary embodiments relate to other features and combinations of features as may be generally recited in the claims.

DESCRIPTION OF PREFERRED EMBODIMENTS

Figures 1, 2:
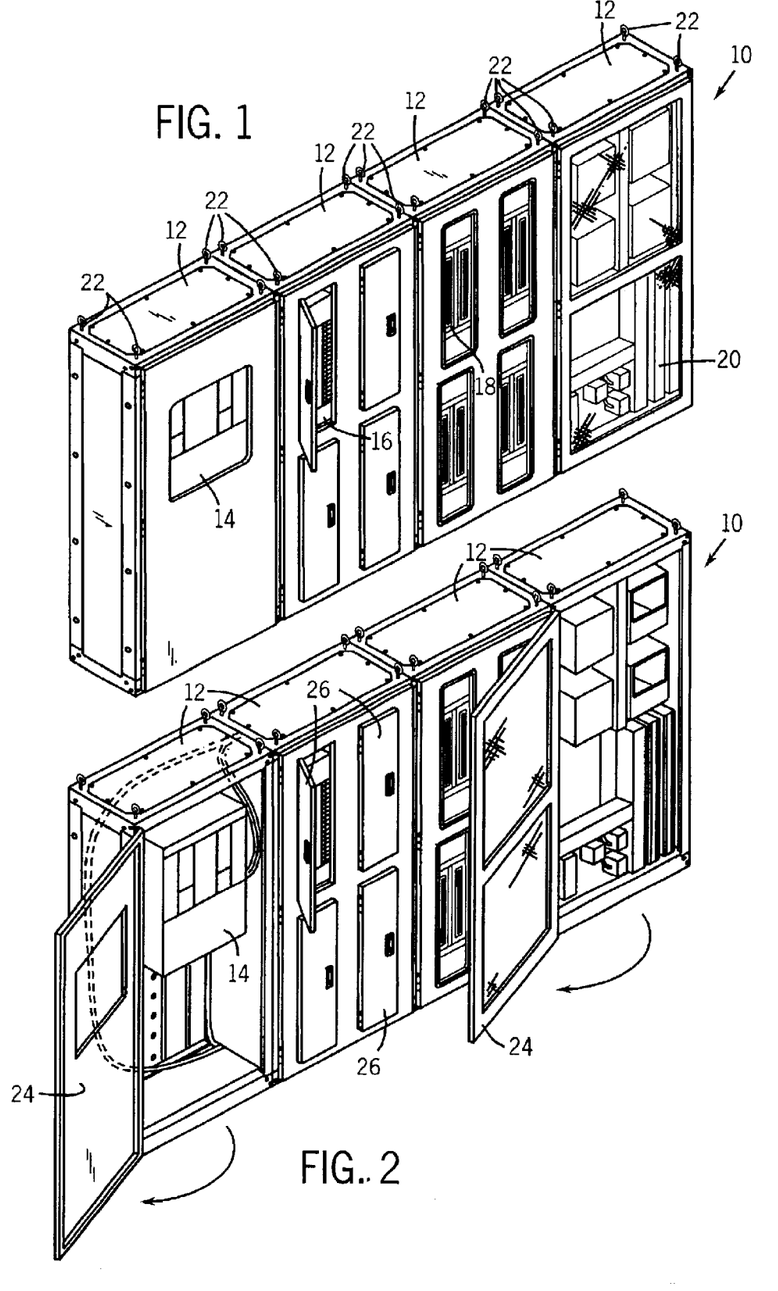
FIG. 1 is a front perspective view of a modular electrical distribution center according to an exemplary embodiment.
FIG. 2 is a front perspective view of a modular electrical distribution center having various doors in an opened position.

Referring to FIG. 1, an electrical distribution center 10 is constructed of a number of linked modules, shown as segments 12. As depicted in FIG. 1, electrical distribution center 10 includes four linked segments 12 but may include more or less segments 12 depending on the desired configuration of electrical distribution center 10.

Each segment 12 serves as a modular component of electrical distribution center 10. Each segment 12 may house an electrical component or components desired for use in electrical distribution center 10. For example, as depicted in FIG. 1, various segments 12 may include one or more of a main distribution panel 14, panelboards 16, contactor boards 18, and a variety of techboards 20. The electrical components depicted in the electrical distribution center 10 of FIG. 1 are intended for illustrative purposes only, and are not meant to be limiting. Additional types of electrical components may include lighting control systems, alarm control systems, transformers, energy management systems, and any number of other electrical components that may be desired in electrical distribution center 10.

The segments 12 depicted in FIG. 1 are linked together such that electrical distribution center 10 may be lifted and transported as a single unit. Lifting eyes 22 depicted in FIG. 1 are one example of an apparatus used to facilitate the lifting and transport of electrical distribution center 10. For example, a fork lift may be used to lift electrical distribution center 10 via a load bar (not shown) threaded through lifting eyes 22. Other methods of lifting and transporting electrical distribution center 10 are also available.

Referring to FIG. 2, segment 12 may include an access opening such as a door 24 hinged to segment 12 such that internal components, such as main distribution panel 14 or techboards 20, depicted in FIG. 2, may be accessed. As depicted in FIGS. 1 and 2, individual components housed within segments 12 also may have openings such as individual component doors 26 that may be opened to access an individual component within segment 12. The doors and component doors may be configured in a variety of ways to facilitate access, provide viewing capability, and permit cooling air circulation as necessary.

Figures 3, 4:
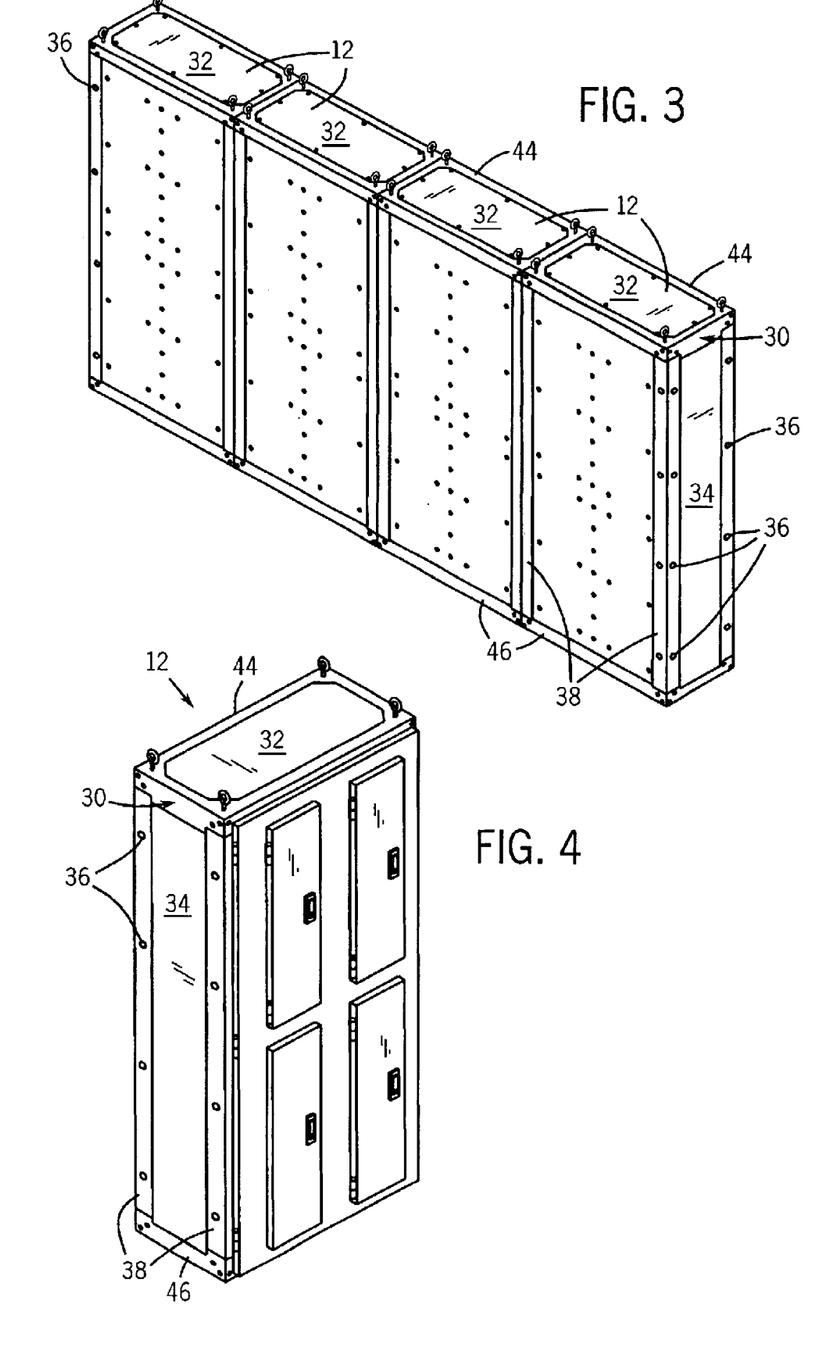
FIG. 3 is a rear perspective view of the modular electrical distribution center of FIG. 1.
FIG. 4 is a front perspective view of a segment of a modular electrical distribution center.

Referring to FIGS. 3 and 4, segment 12 is provided with a rigid structure by frame 30. The frame 30 may include a number of frame segments 38 as well as a top piece 44 and a bottom piece 46. A closure, such as top panel 32 is disposed at the top of segment 12 within top piece 44 and may be removable. Other closures, such as side panels 34 may also be removable from frame 30 without impacting the structural integrity of segment 12. One instance in which side panel 34 may be removed is when multiple segments 12 are linked to one another and it is desired to have an opening between segments 12.

A number of anchor holes 36 may be disposed in frame 30. Anchor holes 36 may be used to link segments 12 to one another by utilizing an attachment mechanism, such as a bolt, extending through adjoining anchor holes 36. Anchor holes 36 may also be utilized to attach wall anchoring brackets (not shown) to segment 12 such that segment 12 or electrical distribution center 10 may be anchored to a wall. Anchor holes 36 are depicted on a side of segment 12 but also be disposed on the rear side of segment 12 (see FIG. 3) and used for anchoring purposes.

Frame 30 and other associated components of segment 12 such as top panel 32, side panels 34, doors 24, and component doors 26 may be constructed of steel, aluminum, stainless steel, or other materials depending on the desired strength, corrosion resistance, and weight of electrical distribution center 10.

Figure 5:
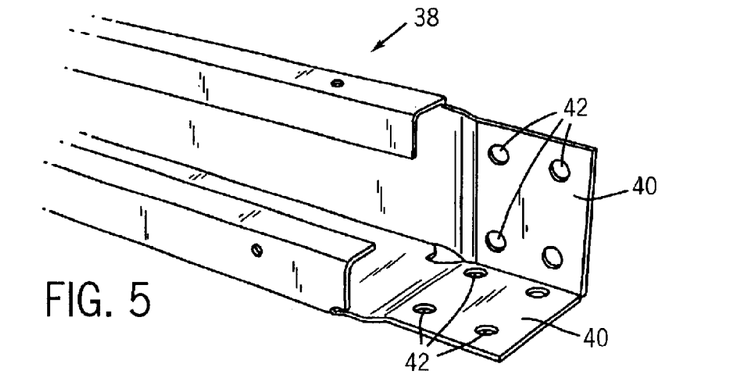
FIG. 5 is a partial perspective view of a frame member used in the construction of the segment of FIG. 3.
Figure 6:
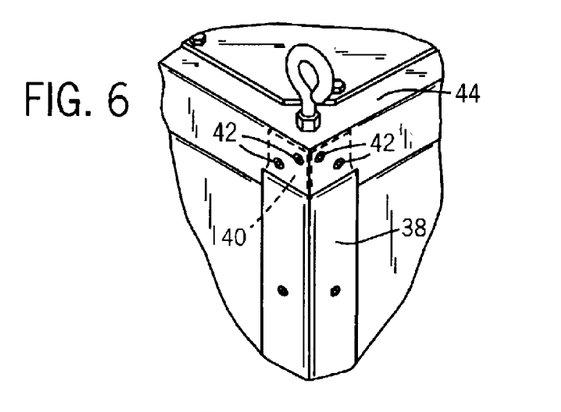
FIG. 6 is an enlarged view of a corner of the segment depicted in FIG. 4.

Individual segments 12 and electrical distribution center 10 are intended to be lifted and transported. Accordingly, frame 30 of individual segments 12 is designed to support such lifting and transport. Referring to FIGS. 5 and 6, individual frame segments 38 may have a channel-like construction including an attachment flange 40 for attachment to the top piece 44 and bottom piece 46. Attachment holes 42 arranged on attachment flange 40 permit frame segments 38 to be attached to the top piece 44 as best shown in FIG. 6 and likewise to bottom piece 46 with attachment hardware.

As depicted in FIGS. 1 and 2, in an exemplary embodiment, segments 12 have like exterior dimensions regardless of the type, brand, or number of electrical components housed therein. Accordingly, electrical distribution center 10 may be constructed by linking together a number of segments 12 having the same exterior configuration regardless of the custom component design of electrical distribution center 10. The modular construction of electrical distribution center 10 using similar segments 12 may reduce the engineering cost, labor, and materials associated with constructing electrical distribution center 10.

Figure 7:
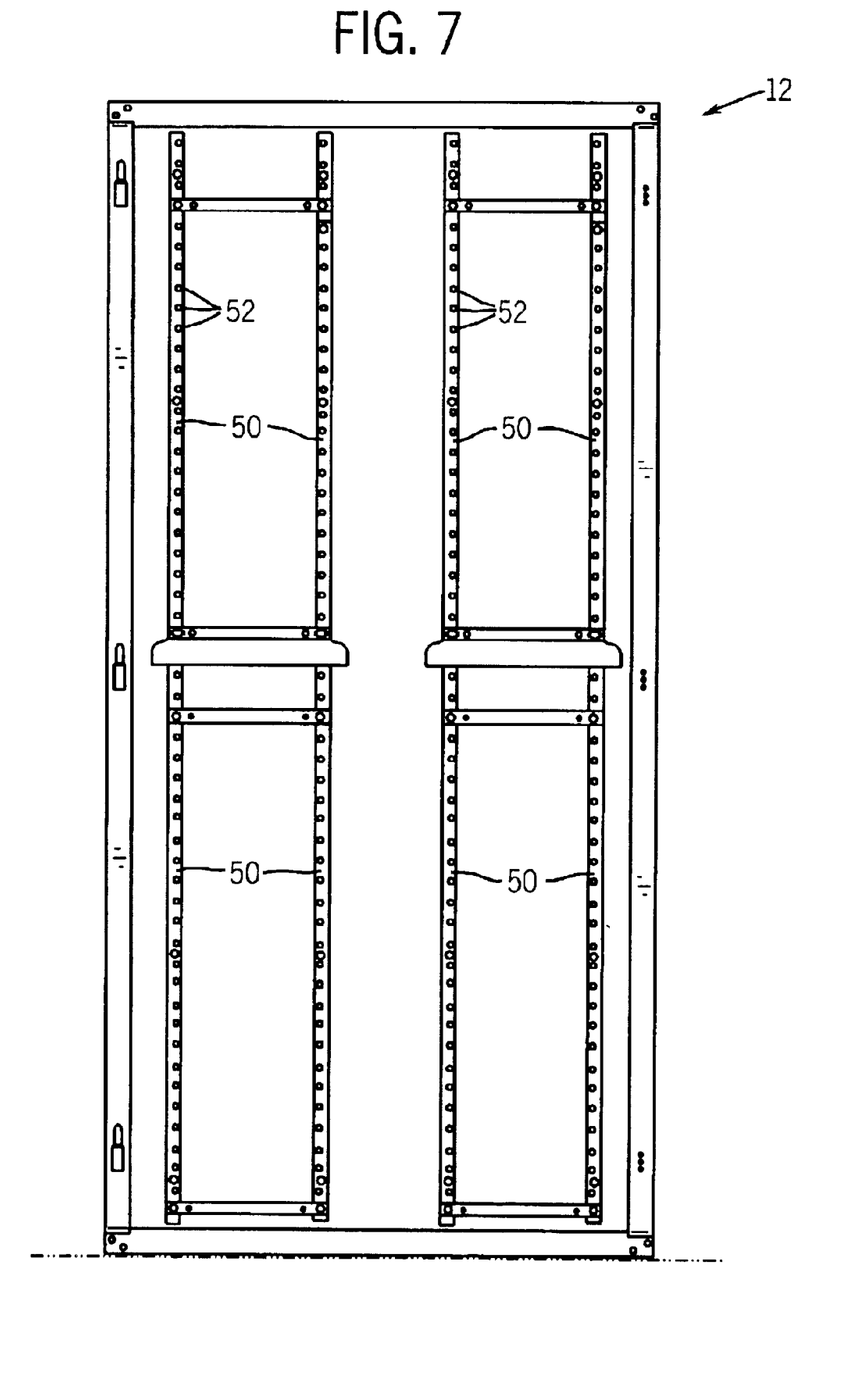
FIG. 7 is a front elevation view of the interior of a modular electrical distribution center segment without mounted components.
Figure 8:
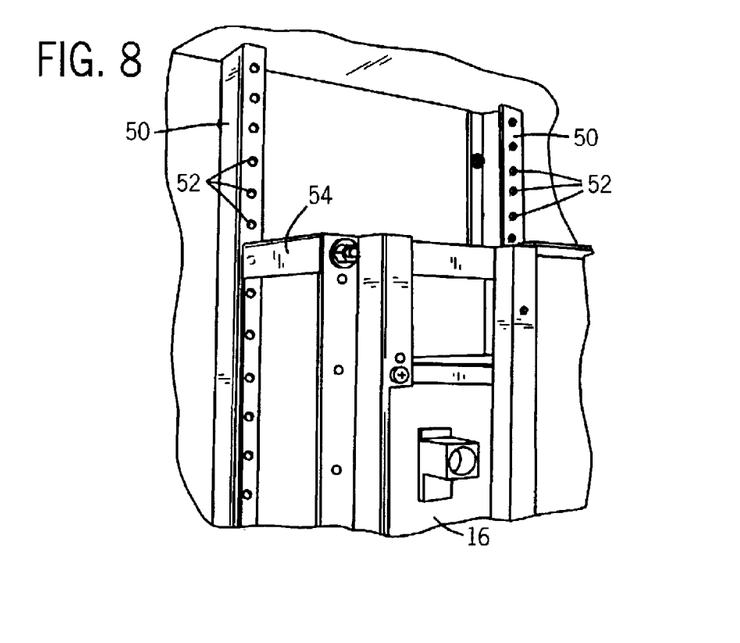
FIG. 8 is a partial rear perspective view of the interior of a modular electrical distribution center segment having a component support frame.

Referring to FIGS. 7 and 8, a preferred embodiment permits the use of like dimensioned segments 12 by a flexible internal design of segments 12 that permits various types, brands, and numbers of electrical components to be housed within.

Support frame 50 is attached within segment 12. Support frame 50 includes mounting devices, shown as support attachment holes 52 spaced along support frame 50 permitting the mounting of component support frame 54 (see FIG. 8). The spaced support attachment holes 52 permit component support frame 54 to be mounted at any desired level or configuration within segment 12.

Referring to FIG. 8, the flexible approach to mounting electrical components within segment 12 is depicted with reference to the mounting of panelboard 16 on component support frame 54. An analogous approach may be utilized to support many other types of electrical equipment within the segment.

According to a particularly preferred exemplary embodiment, panelboard 16 is ordered without the manufacturer's back box, trim, and interior chassis, thus reducing the size of panelboard 16 and permitting panelboard 16 to be incorporated within segment 12 on component support frame 54. Varying sizes of panelboards from many different manufacturers may be accommodated within the same component support frame structure.

Different configurations of the internal support frame and component support frame along with associated support attachment holes may be utilized to support varying types of electrical components. For example, the component support frame necessary to support telephone switching equipment may differ from that used to support a main distribution panel. However, the exterior configuration of the segments remains the same, permitting the linking of modular segments. Further, the support frame may hold various component support frames of different sizes. Further still, components may be directly mounted on the support frame without the use of the component support frame.

Figure 9:
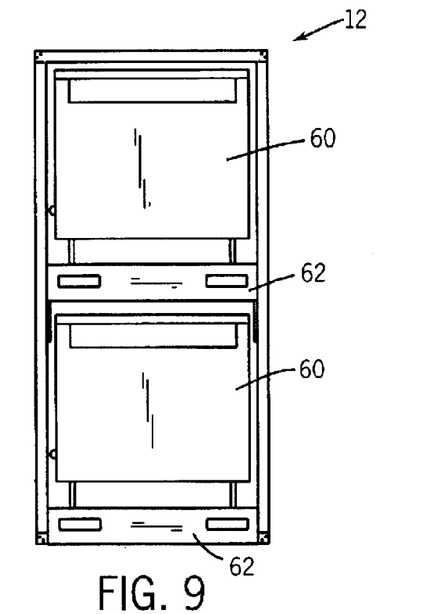
FIG. 9 is a front elevation view of an electrical distribution center segment.

Referring to FIG. 9, segment 12 is depicted as housing two transformers 60 in a vertically stacked configuration. Because of the size of transformers 60, segment 12 has a modified configuration to permit the housing and support of transformers 60. In the construction depicted in FIG. 9, segment 12 includes a pair of shelves 62, designed to support transformers 60, that extend outward from the front of segment 12. Alternatively, the segment may house a single transformer 60. Although the use of segment 12 with transformers 60 requires an altered configuration, the width of segment 12 and overall frame design of segment 12 remains similar to other segments 12 described above, thus permitting the same advantages associated with the modular construction of electrical distribution center 10.

The electrical distribution center may be constructed utilizing an efficient methodology that may reduce costs. A customer specifies the types of electrical components that are needed to support a particular facility under construction or remodeling. The specifications for the electrical distribution center are transmitted to an offsite facility for construction of the electrical distribution center.

The specified electrical components are ordered from the various manufacturers for delivery to the offsite facility. Preferably, the components are ordered without the back box, chassis, and trim provided by the manufacturer such that the components may be easily installed into the support structure of the segments.

The components are then installed into one or more segments. The number of modular segments used depends on the number and type of components making up the electrical distribution center. For example, four panelboards may be installed into one segment, while a single main distribution panel is installed into another segment.

Once the electrical components are installed into a number of segments, the individual segments may be linked to one another to form the electrical distribution center. The electrical components housed within electrical distribution center are wired together completely or to the extent possible.

Finally, the assembled electrical distribution center is transported as a complete unit to the construction site for installation. The robust structural design of the segments, in particular the frame, facilitates lifting and transport of electrical distribution center. As described above, the electrical distribution center may be lifted without the addition of additional structural supports, and transported to another site on a flat bed truck.

Installation at the construction site may include mounting the electrical distribution center to a floor or wall using anchor holes and associated anchoring the hardware. Other methods of anchoring the electrical distribution center are also known. Finally, the electrical distribution center is connected to the electrical systems at the facility being built or remodeled. The pre-wiring of the electrical distribution center before transport facilitates the installation of the electrical distribution center at the facility.

Figure 10:
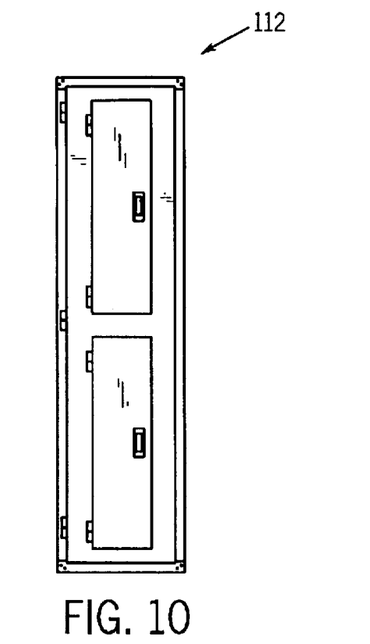
FIG. 10 is a front elevation view of a segment of an electrical distribution center.

Referring to FIG. 10, in an additional exemplary embodiment, a segment 112 may have a different width to provide greater flexibility in the overall construction of electrical distribution center 10. Segment 112 depicted in FIG. 10 may still be linked to other segments 12 thus providing the additional flexibility of a different width but not greatly impacting the efficiencies associated with the modular design of electrical distribution center 10. Likewise, a segment may have a reduced height relative to other segments, permitting the accommodation of an obstruction at the site of installation, or to comply with applicable electrical codes.

Figure 11:
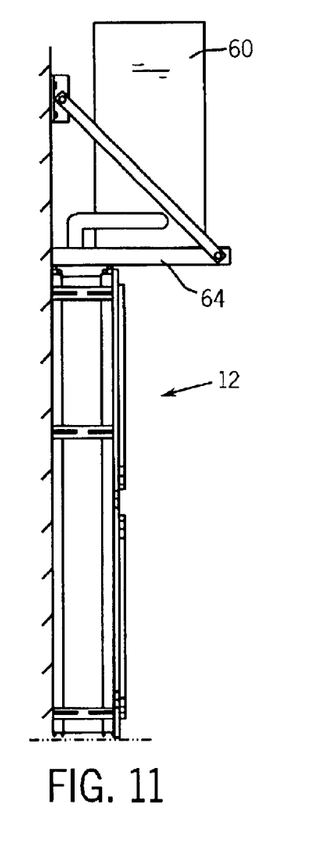
FIG. 11 is a side elevation view of a segment of an electrical distribution center having an additional top pad mounted component.
Figure 12:
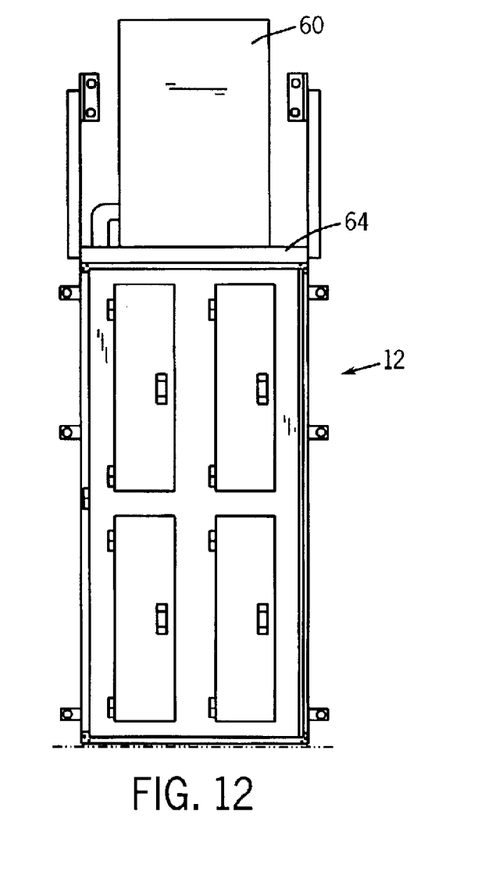
FIG. 12 is a front elevation view of the segment shown in FIG. 11.

Referring to FIGS. 11 and 12, a component such as transformer 60 may be mounted on top of a segment 12. In order to support the added weight of transformer 60, or other component that may be mounted to the top of segment 12, a support structure having pad 64 is used. Pad 64 may be a metal structure several inches thick to support transformer 60, but may take other forms as necessary to provide adequate support.

The ability to vertically stack electrical components enhances space utilization in the design of the electrical distribution center. The configuration of installed electrical components generally must comply with various electrical codes. The design configuration of the segments permits vertical stacking of components in compliance with electrical codes, while individual installation of different electrical components ordered directly from the manufacturer may not easily permit such vertical stacking capability.

Figure 13:
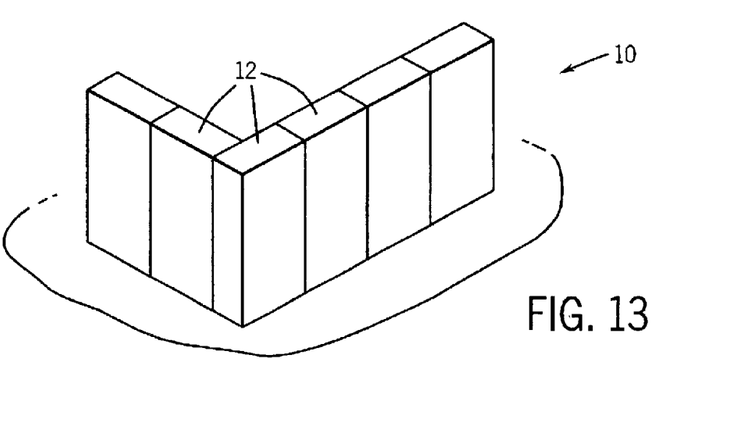
FIG. 13 is a schematic perspective view of a modular electrical distribution center.
Figure 14:
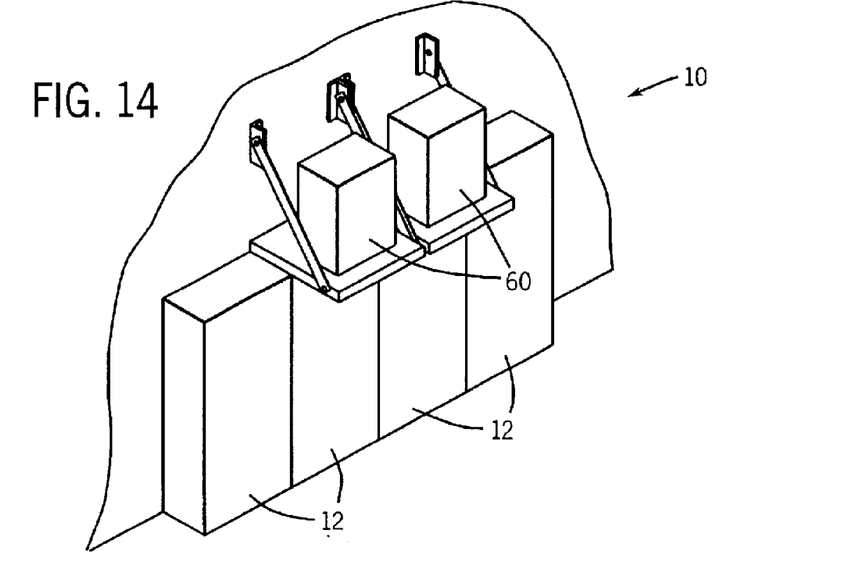
FIG. 14 is a schematic perspective view of a modular electrical distribution center.

Referring to FIGS. 13 and 14, electrical distribution center 10 may have various configurations depending on how segments 12 are linked together and how many segments 12 are used. The configurations shown are merely particular examples of the many that are possible given the modular design of electrical distribution center 10.

It is to be understood that the invention is not limited in its application to the details of construction and the arrangements of components set forth in the preceding description or illustrated in the drawings. For example, the steps associated with the method of making and installing the modular electrical distribution center may be performed in a different order or include other steps as necessary. Furthermore, other substitutions, modifications, changes, and omissions may be made in the design, operating conditions, and arrangements of the exemplary embodiments without departing from the scope of the invention as expressed in the appended claims.

What is claimed is:

1. A modular electrical distribution system comprising:
   a number of linked segments;
   a pad disposed on top of one of the segments configured to support an exterior electrical component;
   a first electrical component mounted in one of the segments; and
   a second electrical component mounted in another one of the segments, wherein the first and second electrical components are made by different manufacturers;
   wherein the linked segments are configured to be transported as a single unit without an additional external framework.

2. The modular electrical distribution system of claim 1 wherein one of the segments houses more than one electrical component.

3. The modular electrical distribution system of claim 1 wherein one or more of the segments comprises a means for lifting.

4. The modular electrical distribution system of claim 3 wherein the means for lifting comprises a plurality of lifting eyes.

5. The modular electrical distribution system of claim 1 wherein the electrical components comprise distribution panels, panelboards, contactor boards, or techboards.

6. The modular electrical distribution system of claim 1 wherein one of the electrical components comprises a transformer.

7. The modular electrical distribution system of claim 1 wherein the exterior electrical component comprises a transformer.

8. The modular electrical distribution system of claim 1 wherein the unit does not require an external framework for support.

9. The modular electrical distribution system of claim 1 wherein the unit may be lifted without an external framework for support.

10. The modular electrical distribution system of claim 1 wherein each segment has a standardized internal framework to house different types of electrical components.

11. The modular electrical distribution system of claim 1 wherein the segments are interchangeable.

12. A modular electrical distribution system comprising:
    a number of segments;
    a first electrical component mounted in a first one of the segments;
    a second electrical component mounted in a second one of the segments, wherein the first and second electrical components are different types of electrical power components; and
    a shelf mounted within at least one of the number of segments and configured to support a third electrical component which extends from at least one of the number of segments;

wherein the segments are configured to be linked together and transported as a single unit without an additional external framework.

13. The modular electrical distribution system of claim 12 wherein one of the segments houses more than one electrical component.

14. The modular electrical distribution system of claim 12 wherein one or more of the segments comprises a means for lifting.

15. The modular electrical distribution system of claim 14 wherein the means for lifting comprises a plurality of lifting eyes.

16. The modular electrical distribution system of claim 12 wherein the electrical power components comprise distribution panels, panelboards, contactor boards, or techboards.

17. The modular electrical distribution system of claim 12 wherein one of the electrical power components comprises a transformer.

18. The modular electrical distribution system of claim 12 further comprising:

a pad disposed on top of one of the segments configured to support an exterior electrical component.

19. The modular electrical distribution system of claim 18 wherein the exterior electrical component comprises a transformer.

20. The modular electrical distribution system of claim 12 wherein the unit does not require an external framework for support.

21. The modular electrical distribution system of claim 12 wherein the unit may be lifted without an external framework for support.

22. The modular electrical distribution system of claim 12 wherein the segments are interchangeable.

23. The modular electrical distribution system of claim 12 wherein each segment has a standardized internal framework to house different types of electrical components.

24. The modular electrical distribution system of claim 23 wherein the standardized internal framework comprises a plurality of apertures, wherein the apertures permit the electrical components to be installed in more than one location within the housing.

25. The modular electrical distribution system of claim 12 wherein the third electrical component is a transformer.

* * * * *